US006189678B1

(12) United States Patent
Loewenthal et al.

(10) Patent No.: US 6,189,678 B1
(45) Date of Patent: Feb. 20, 2001

(54) APPARATUS FOR FORMING GROUPS OF SUPERPOSED FLAT ITEMS

(75) Inventors: Horst Loewenthal, Waldshut-Tiengen; Alfred Wipf, Jestetten, both of (DE)

(73) Assignee: SIG Pack Systems AG, Beringen (CH)

( * ) Notice: Under 35 U.S.C. 154(b), the term of this patent shall be extended for 0 days.

(21) Appl. No.: 09/095,658

(22) Filed: Jun. 11, 1998

Related U.S. Application Data

(63) Continuation-in-part of application No. PCT/CH96/00423, filed on Dec. 2, 1996.

(30) Foreign Application Priority Data

Dec. 15, 1995 (CH) .................................................. 03557/95

(51) Int. Cl.[7] .................................................. B65G 47/26
(52) U.S. Cl. ..................................... 198/418.3; 414/497.9
(58) Field of Search ...................... 198/418.3; 414/797.9, 414/798, 798.1, 795.1

(56) References Cited

U.S. PATENT DOCUMENTS

| 1,092,613 | * | 4/1914 | Warme . | |
| 1,126,194 | * | 1/1915 | Graham . | |
| 1,722,048 | * | 7/1929 | Hill . | |
| 2,872,020 | * | 2/1959 | Hansel et al. . | |
| 3,625,384 | * | 12/1971 | Boerger et al. | 414/413 |
| 3,978,571 | * | 9/1976 | Orlando et al. | 29/730 |
| 4,013,179 | * | 3/1977 | Fluck | 414/796.1 |
| 4,044,896 | * | 8/1977 | Reinecke | 414/797.7 |
| 4,421,019 | * | 12/1983 | Hocking et al. | 99/450.4 |
| 4,547,114 | * | 10/1985 | Watrous et al. | 414/793.9 |
| 5,473,978 | * | 12/1995 | Colombo | 99/443 C |
| 5,823,738 | * | 10/1998 | Spatafora et al. | 414/795.1 |

FOREIGN PATENT DOCUMENTS

| 400892 | 4/1966 | (CH) . |
| 962446 | 7/1964 | (GB) . |
| 1111619 | 5/1968 | (GB) . |

* cited by examiner

Primary Examiner—Christopher P. Ellis
Assistant Examiner—Rashai Sharma
(74) Attorney, Agent, or Firm—Venable; Gabor J. Kelemen

(57) ABSTRACT

An apparatus for forming groups of superposed, flat items, includes a conveyor having a transporting device traveling in a conveying direction along a generally horizontal working flight; and a plurality of upstanding pusher fingers secured to the transporting device. A plurality of storage chutes are serially positioned above the working flight for holding items in a superposed stack therein. An item-retaining device is situated at a lower, item-discharging end of each chute. The item-retaining device includes a component defining an item-retaining surface for retaining the items in the chute by supporting a lowermost item of the stack. Each pusher finger is arranged for travel through the item-discharging end for pushing all items forming part of the stack in the chute and being situated in a path of travel of the pusher finger, off the item-retaining device and for advancing the items in the conveying direction along the working flight. A height-adjusting device sets the component into different selected positions for changing a vertical distance of the item-retaining surface from the working flight to vary a number of items forming part of the stack in the chute and being situated in the path of travel of the pusher fingers.

12 Claims, 5 Drawing Sheets

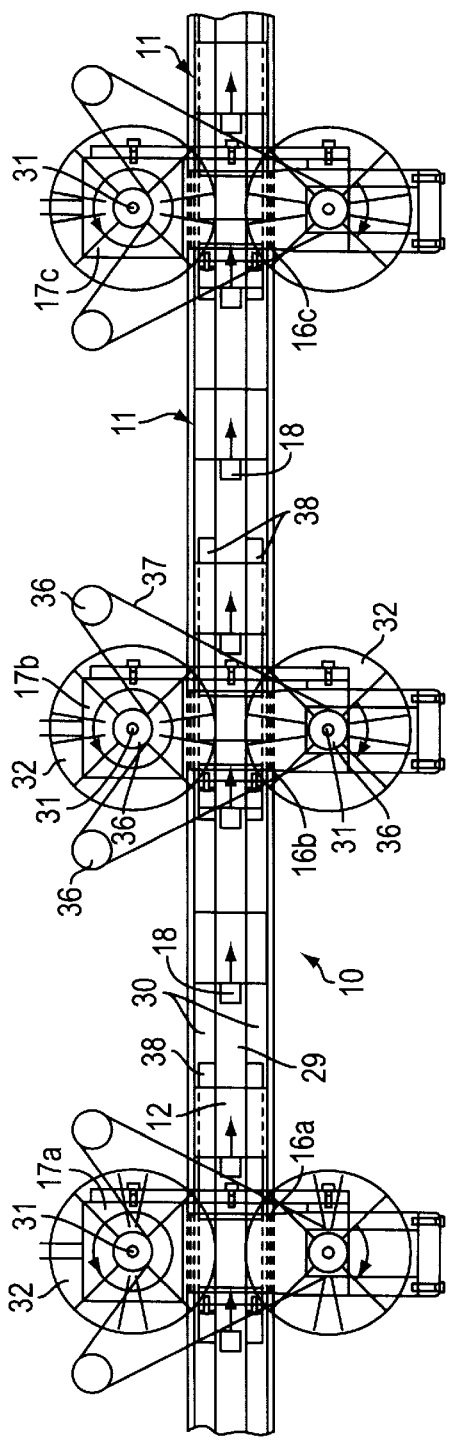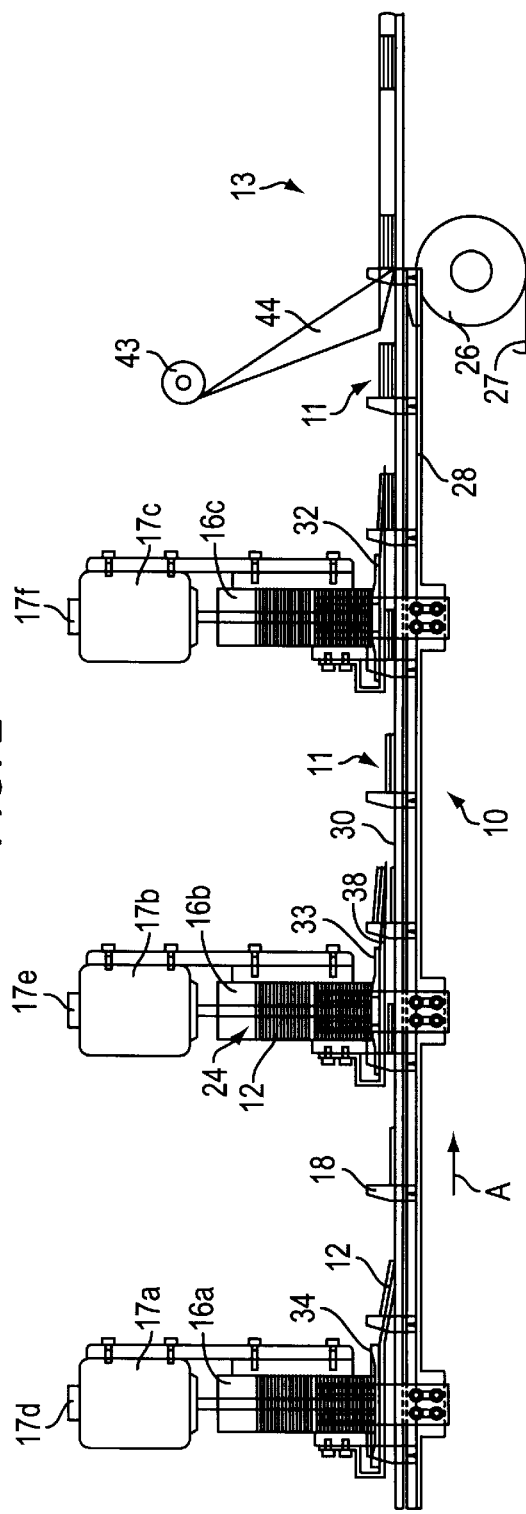

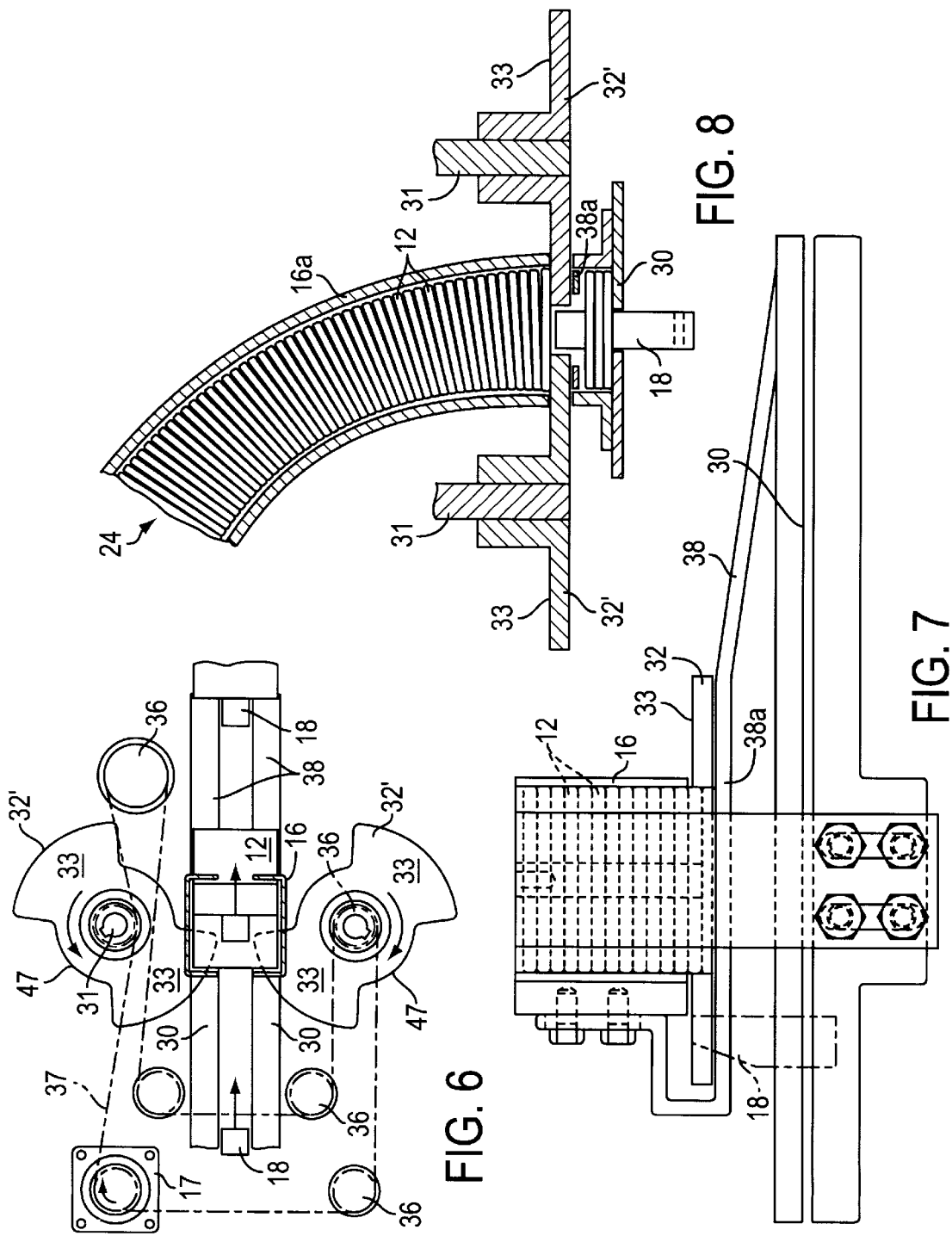

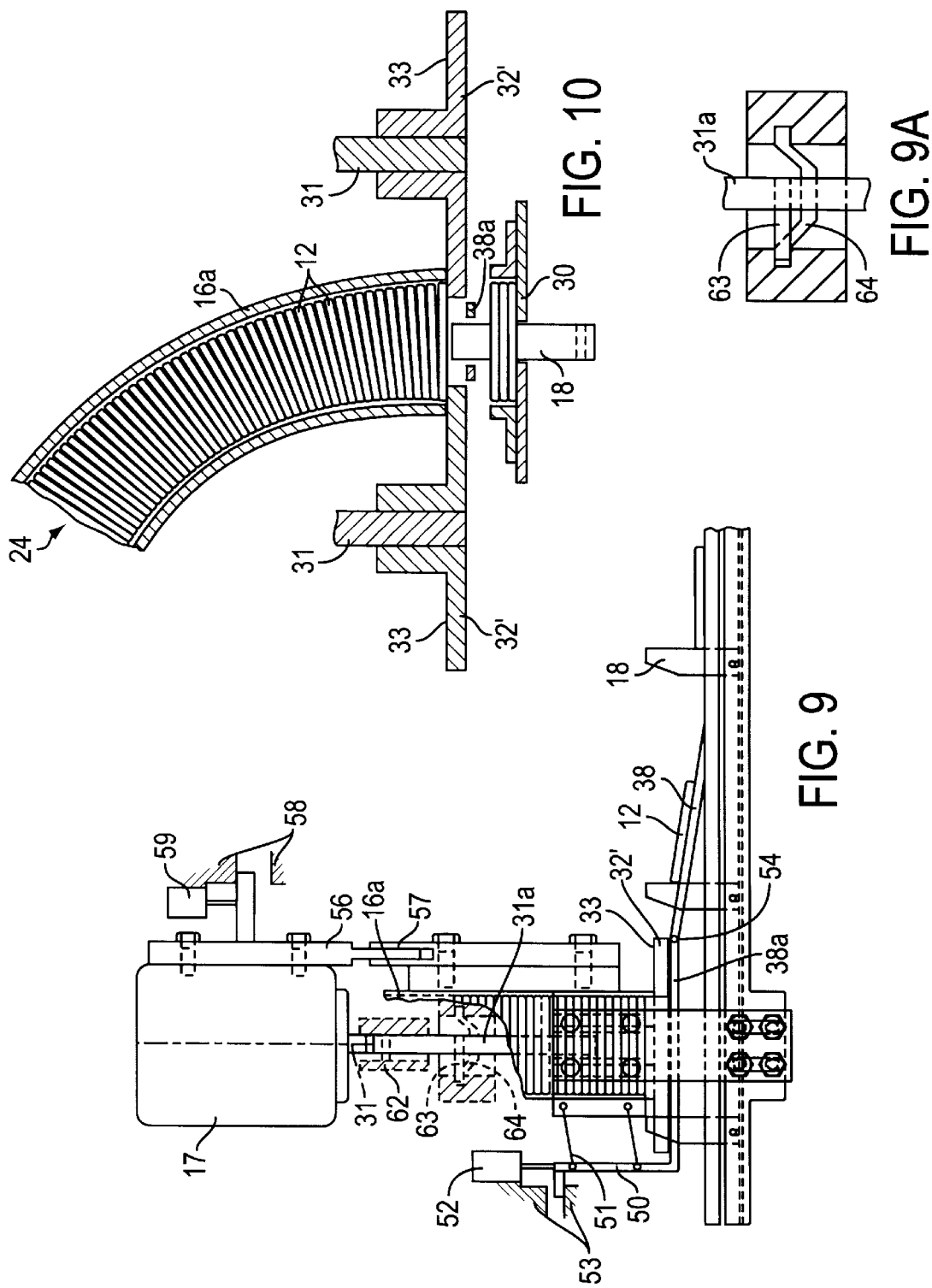

US 6,189,678 B1

APPARATUS FOR FORMING GROUPS OF SUPERPOSED FLAT ITEMS

CROSS REFERENCE TO RELATED APPLICATION

This application is a continuation-in-part of International Application PCT/CH96/00423 filed Dec. 2, 1996.

This application claims the priority of Swiss Application 3557/95 filed Dec. 15, 1995 which is incorporated herewith by reference.

BACKGROUND OF THE INVENTION

This invention relates to an apparatus for forming groups of superposed flat items, such as disk-shaped confectionary products. The apparatus has a conveyor which carries projecting fingers to push the item groups, while they are being formed, along an upper, approximately horizontal working flight in a conveying direction. Above the working flight a plurality of serially arranged chutes are provided each accommodating a stack of superposed items and each having a lower, item-discharging opening above the working flight, at a distance therefrom. The fingers are adapted to push simultaneously a plurality of items out of the lower end of the chutes.

An apparatus of the above-outlined type is described in British Patent 1,001,036. A circulating conveyor chain carries pusher fingers at uniform distances which project upwardly from the chain along a horizontal working flight. Above the working flight two chutes are arranged in series, containing stacks of superposed flat items. The bottom of each chute is situated above and spaced from the chain and is closed by a slotted base while being open at the lower end in the conveying direction. As the fingers travel with the circulating chain, they project through the slot of the base plate and push the lowest item out of the chute. The item removed in this manner from the first chute is pushed through underneath the base plate of the second chute so that the item moved out from the second chute will be superposed on the item originating from the first chute. Subsequently two of such item groups are packed together. Such an apparatus has been found to be satisfactory but has the disadvantage that its versatility is limited.

SUMMARY OF THE INVENTION

It is an object of the invention to provide an apparatus of the above-outlined type which has a substantial adaptability.

This object and others to become apparent as the specification progresses, are accomplished by the invention, according to which, briefly stated, the apparatus for forming groups of superposed, flat items, includes a conveyor having a transporting device traveling in a conveying direction along a generally horizontal working flight; and a plurality of upstanding pusher fingers secured to the transporting device. A plurality of storage chutes are serially positioned above the working flight for holding items in a superposed stack therein. An item-retaining device is situated at a lower, item-discharging end of each chute. The item-retaining device includes a component defining an item-retaining surface for retaining the items in the chute by supporting a lowermost item of the stack. Each pusher finger is arranged for travel through the item-discharging end for pushing all items forming part of the stack in the chute and being situated in a path of travel of the pusher finger, off the item-retaining device and for advancing the items in the conveying direction along the working flight. A height-adjusting device sets the component into different selected positions for changing a vertical distance of the item-retaining surface from the working flight to vary a number of items forming part of the stack in the chute and being situated in the path of travel of the pusher fingers.

BRIEF DESCRIPTION OF THE DRAWINGS

FIG. 2 is a schematic top plan view of a preferred embodiment of the invention.

FIG. 3 is a schematic side elevational view of the structure shown in FIG. 2.

FIG. 6 is a top plan view of a detail of an another preferred embodiment.

FIG. 7 is a side elevational view of the structure shown in FIG. 6.

FIG. 8 is a sectional front elevational view of the structure shown in FIG. 7.

FIG. 9 is a fragmentary side elevational view, similar to FIG. 3, of a further preferred embodiment.

FIG. 9a is an enlarged sectional side elevational detail of FIG. 9.

FIG. 10 is a sectional front elevational view of the structure shown in FIG. 9.

DESCRIPTION OF THE PREFERRED EMBODIMENTS

Figure 1:
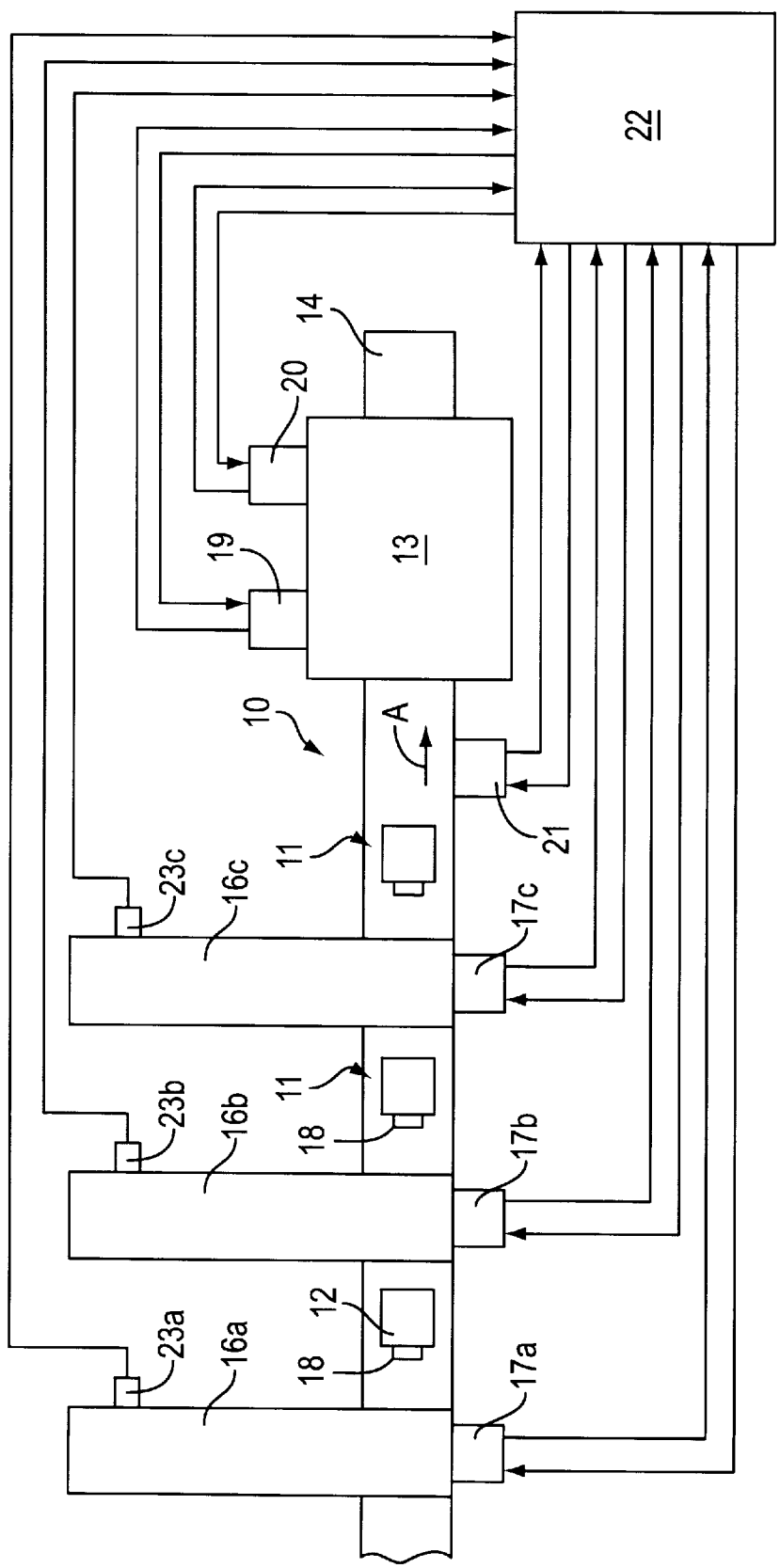
FIG. 1 is a schematic plan view, with block diagram, of an apparatus incorporating the invention.

FIG. 1 schematically illustrates the control system of an apparatus according to the invention. The apparatus includes a conveyor 10 which advances, in a conveying direction A, an item group 11 under formation, composed of flat, superposed disk-like items 12, to a packing machine 13 in which the groups are wrapped. The wrapped groups 11 are discharged onto an output conveyor 14. The groups 11 are advanced by pusher fingers 18 mounted on the conveyor 10. Above the conveyor 10 a plurality (for example, three, as shown in FIG. 1) curved chutes 16a, 16b and 16c are arranged in a series as viewed in the conveying direction A. Items 12 are continuously introduced into the chutes at the top to maintain respective item stacks therein. The lower, terminal chute portion which is positioned above the conveyor 10 has a vertical orientation. The lowest item 12 in each chute 16a, 16b and 16c is supported on an adjustable item-retaining device driven by respective motors 17a, 17b and 17c. At least in one of the positions of the item-retaining device at least the lowermost item of the respective chute 16a, 16b or 16c is pushed out of the chute by means of a finger 18 forming part of the conveyor 10. The item moved out in this manner from the chute 16a is, by means of the respective finger 18, pushed through underneath the lower ends of the chutes 16b and 16c and, at the same time, an item 12 is moved out of these chutes so that groups 11 of superposed items will form. The packing machine 13 has a motor 19 for forming a longitudinal seam of a wrapper folded about such group as well as a motor 20 for driving transverse sealing shoes. Further, a motor 21 is provided for driving the conveyor 10. All the motors 17a, 17b, 17c, 19, 20 and 21 are provided with a respective angular position sensor whose signals are applied to a common control apparatus 22 which controls the motors. Such angular position sensors are shown at 17d, 17e and 17f for the respective motors 17a, 17b and 17c. Additionally, signals generated by the sensors 23a, 23b and 23c are applied to the control apparatus 22. These sensors are situated at an upper portion of the respective chutes and their signals thus indicate the presence or absence of the top item of a stack 24 in the respective chute 16a, 16b or 16c at the height position of the respective sensors 23a, 23b and 23c. The sensors 23a, 23b and 23c may be, for example, optical barriers operating on reflecting light.

FIGS. 2–5 illustrate a structural embodiment of the gathering and grouping apparatus according to the invention. The conveyor 10 includes an endless chain 27 circulating about sprockets 26. The upper reach of the chain 27 constitutes the working flight 28. The pusher fingers 18 are secured to the chain 27 and extend through a longitudinal slot 29 formed in a slide 30 serving as a gathering guide on which the groups 11 of items 12 are formed and advanced.

At the lower end of each chute 16a, 16b and 16c an adjustable item-retaining device is disposed. Each item-retaining device is formed by two side-by-side arranged disks 32 rotatable about a vertical axis of a shaft 31. The disks 32 have on their upper face at least two item-retaining surfaces 33, 34 a lower surface 33 and an upper surface 34 spaced at an axial distance from one another and connected to one another by helical oblique surfaces 35. The axial distance of the surfaces 33 and 34 from each other is approximately an integer multiple of the thickness of an item 12. One of the shafts 31 of each disk pair is driven by a respective servomotor 17a–17c. The other of the shafts 31 of the disk pair is mechanically coupled to the first-noted shaft, for example, by means of belt sprockets 36 and a toothed belt 37 or a chain to obtain a synchronous, oppositely directed rotation. At each chute 16a, 16b and 16c, downstream of the respective disks 32 and above the generally horizontal slide 30, two inclined slide plates 38 are arranged whose upper edge is situated slightly below the level of the lower supporting surface 33 of the disks 32. The lower, downstream edge of the slide plates 38 is progressively at a higher level as viewed for the consecutive chutes 16a–16c. The slides 30 are bounded by lateral guides 39 for guiding the groups 11 under formation.

Turning to FIG. 3, the input end of the packing machine 13 is shown symbolically. Wrapping material 44 is drawn off a supply reel 43 and is folded about the item groups 11 by means of a conventional folding box, not shown. The downstream sprocket 26 for the chain 27 is situated in the region of the folding box. The longitudinal edges of the wrapper sheet are subsequently sealed and thereafter a transverse sealing is performed in a conventional manner between the wrapped groups 11.

In the description which follows, the normal operation of the above-described apparatus will be set forth.

The two cooperating disks 32 of one of the chutes 16a–c are rotated (angularly positioned) in such a manner that the lowest item 12 lies on the lower supporting surface 33 and in each instance two items 12 are pushed out of the chute by the fingers 18. The disk pairs of the other two chutes are rotated in such a manner that the lowest item 12 lies on the upper supporting surface 34 and thus only a single item 12 is moved out of the respective chute. Thus, from chute 16a a stack of two items moves towards the chute 16b where a single item is deposited on the stack which continues to the chute 16c where a fourth single item is placed on the three-time stack. In this manner, groups 11 of four items 12 each are formed. In the normal operation when all chutes are uniformly supplied with items, the removal of two items uniformly alternates in the three chutes 16a–c; in such an operation the disks 32 are periodically rotated by 90°.

If, however, in one of the chutes 16a–c the respective sensor 23a–c is activated and reports the absence of an item (that is, the uppermost item of the stack in that chute is situated below the sensor), then as long as the sensor continues to report such an absence, the respective disk pair is rotated automatically into such a position that the article stack will lie on the supporting surface 34 and thus continuously only a single item is pushed out from that chute by the fingers 18. In this manner the non-uniform supply of items 12 to the chutes 16a–c is automatically compensated for.

Figure 5:
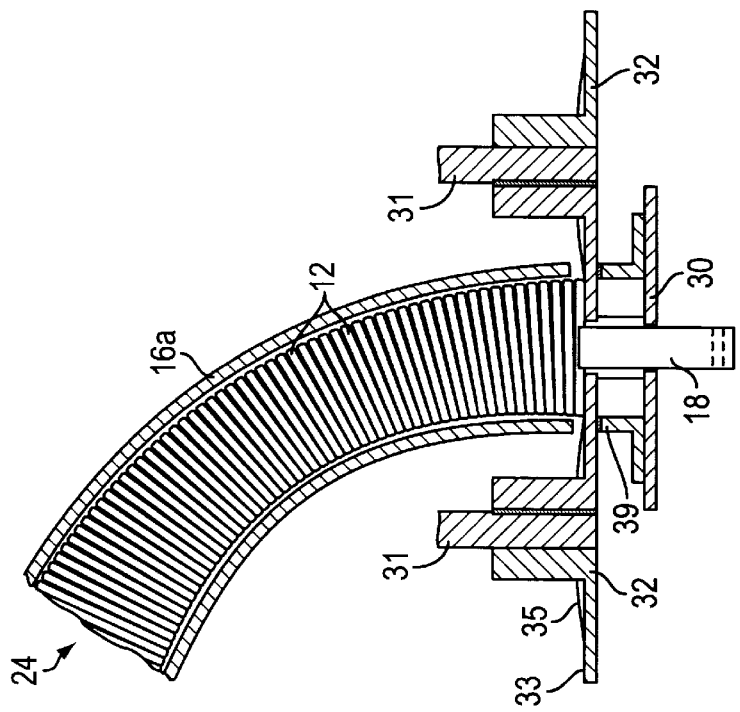
FIG. 5 is a sectional view taken along line V—V of FIG. 4.
Figure 4:
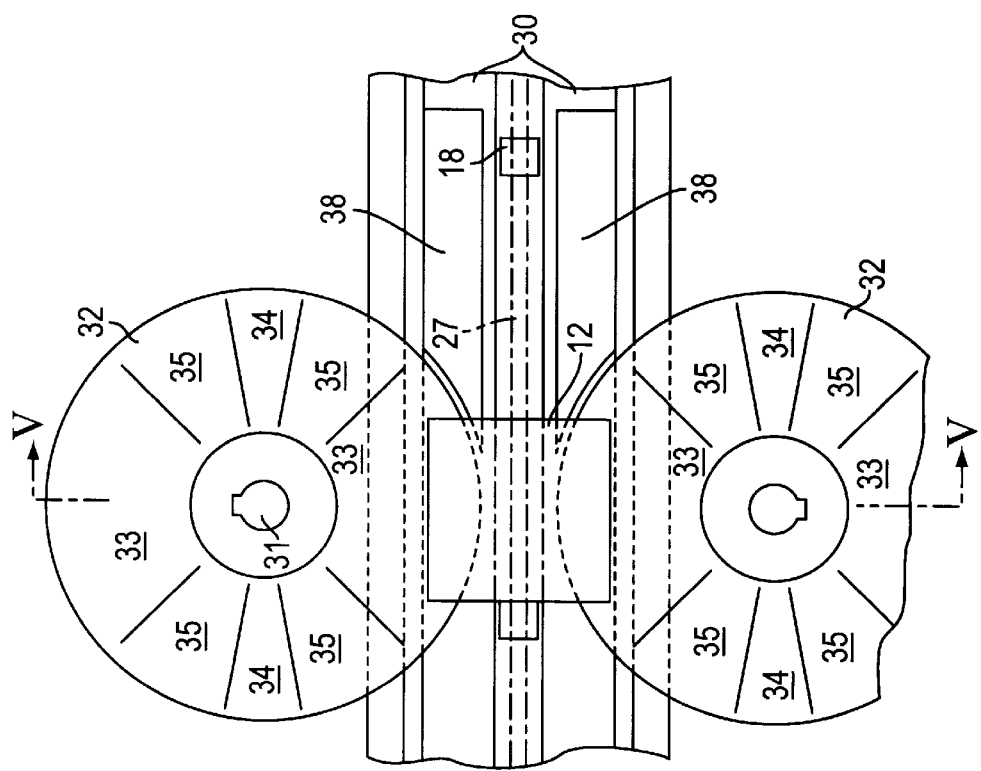
FIG. 4 is an enlarged fragmentary top plan view of the structure shown in FIG. 2.

By adjusting the height of the chutes 16a–c and the disks 32 the apparatus may also be driven in such a manner that selectively only one item 12 or no item is pushed out by the fingers 18 as indicated in FIG. 5.

In case even larger fluctuations of the supply rate need to be compensated for or in case groups with more than four items have to be formed, the disks 32 are replaced by other disks of such a construction that the supporting surfaces 33, 34 have three different levels so that selectively no item or one or two items may be simultaneously removed from the respective chute. The apparatus thus has a great flexibility and may be adapted readily to changing operating conditions. The apparatus makes possible a high output while gently treating the items and also permits a selective charging rate from the various chutes. It is to be understood that more than three chutes may be provided with the associated switching means.

A second embodiment illustrated in FIGS. 6, 7 and 8 differs principally from that of the embodiment illustrated in FIGS. 2–5 in that the disks 32' have only a single supporting surface 33 lying in one radial plane but have two diametrically opposite cutouts 47. The thickness of the disks 32' is slightly less than twice the thickness of the individual items. The two slide plates 38 include a horizontal portion 38a disposed directly underneath the disk 32'.

In operation the disks 32' may be angularly positioned (turned) such that they assume a first mode in which one of the supporting faces 33 of each disk 32' is situated underneath the chute 16a as shown in FIG. 8. In such a case, the fingers 18 do not push out any item from the chute 16a. In another mode, one of the cutouts 47 of each disk 32' is situated underneath the chute 16a so that the lowermost item 16 is supported on the slide plate portion 38a as shown in FIG. 7. In such a case in each instance two items 12 are pushed out of the chute 16a by the fingers 18. The switchover from such a mode into the first mode is performed upon passage of a finger 18 in such a manner that the supporting surfaces 33 are slid underneath the stack 24 of the items 12 in the chute 16a at a time when the stack 24 is still supported by the two items 12 just leaving the chute as shown in FIG. 6. This embodiment is particularly adapted for less delicate items 12.

The disk thickness may also be selected such that only a single item 12 is pushed out of the chute. The two oppositely located wings of the disks 32' may be of unlike thicknesses such that one wing is approximately only as thick as an item 12. In such a case, alternatingly zero, one or two items 12 may be moved out of the chute. Also, in the embodiment according to FIGS. 6, 7 and 8, two or more chutes may be arranged in series along the conveyor 10.

According to another embodiment of the invention, the adjustable item-retaining device at the lower end of the chutes may be constituted by vertically adjustable slide plates that may be set, corresponding to the item thickness, in two or more steps by means of pneumatic cylinders.

In FIGS. 9 and 10 a further embodiment is illustrated which corresponds generally to that shown in FIGS. 6, 7 and 8 and which thus has disks 32' provided with recesses and horizontal slide plate portions 38a which extend underneath the chutes (by way of example chute 16a is illustrated). The diameter of the supporting surfaces 33 is, in this embodiment, less than in the embodiment according to FIGS. 6, 7 and 8 and the slide plate portions 38a are narrower and are arranged externally of the periphery of the supporting surfaces 33. The slide plate portions 38a as well as the disks 32' are height-adjustable. For this purpose, the slide plate portions 38a are mounted on a carrier 50 which, by means of a parallelogram linkage 51, is mounted such that it is vertically movable on the chute 16a. The carrier 50 is, by means of a drive 52 (such as a pneumatic cylinder) vertically adjustable between limits set by adjustable stops 53. The stroke between the stops 53 is set such that it equals the thickness of an item 12. In the lower end position of the carrier 50 two items 12 are simultaneously removed, and in the upper end position one item 12 is removed if the disks 32' are angularly positioned such that the apertures 47 (not visible in FIGS. 9 and 10) are situated underneath the chute 16a. The slide plate portions 38a are connected by hinges 54 with the inclined slide plates 38.

The motor 17 and the two disk shafts 31 are mounted on a further carrier 56 which is movably supported in a vertical direction between two adjustable stops 58 by means of a linear guide 57. The carrier 56 is connected with a further drive 59 (such as a pneumatic cylinder). The stops 58 are so set that the stroke of the carrier 56 is slightly greater than twice the thickness of the items 12 and further, the supporting surface 33 is, in the lower end position of the carrier 50, slightly underneath the upper side of the slide plate portions 38a when the latter are in the lower position.

In operation, when one item 12 (in the upper end position of the carrier 50) is pushed out of the chute 16a or when two items 12 (in the lower end position of the carrier 50) are pushed out, the carrier 56 is always in the upper terminal position and the disks 32' are, in the manner shown in FIG. 6, rotated in synchronism with the outward motion of the items 12, so that the lowermost remaining item 12 of the stack 24 is continuously supported from below in the chute 16a. If the successive finger 18 is again to push out one or two items from the chute 16a, first the carrier 56 is lowered so that the lowermost item 12 of the stack 24 arrives over its entire length into simultaneous contact with the slide plate portions 38a. Thereafter, the disks 32' are rotated about 90° and the carrier 56 is again raised into its upper end position. The drives 52 and 59 are also controlled by the control apparatus 22.

In the embodiment shown in FIGS. 9 and 10 an only one-sided support of the lowermost item 12 remaining in the chute 16a is avoided during the removal of items 12 and therefore such lowermost item does not drop onto the slide plate portions 38a but is deposited gently thereon. This embodiment therefore is adapted particularly for delicate items such as rectangular confectionary products which have a break line across their longitudinal middle to facilitate breakage into two halves. Selectively, no items or one or two items 12 may be pushed out of the chutes.

As a variant of the embodiment of FIGS. 9 and 10, the carrier 50 may be adjustable in two steps corresponding to the thickness of the items 12. In such an arrangement, the drives 52 and 59 may be, for example, servomotors which include angular position sensors and rotate threaded spindles carrying traveling nuts affixed to the carriers 50, 56. The stroke of the carrier 56 is set to slightly more than three times the item thickness. In this embodiment, selectively no item or one, two or three items 12 may be pushed out of the chute 16a. The stroke velocities of the carriers 50, 56 is varied from zero to a maximum and then to zero by conventional electrical or mechanical means.

In FIG. 9, yet another alternative for the height adjustment of the disks 32' is shown in broken lines. The carrier 56 is connected rigidly with the chute 16a; the drive 59 as well as the stops 58 and the guide 57 are dispensed with. The lower portion 31a of the shafts 31 is connected torque-transmittingly, but shiftable axially with the upper shaft part by means of a coupling 62. Also referring to FIG. 9a, as cam 63, rigidly connected with the shaft part 31a, runs in a stationary guide track (cam track) 64. The stroke of the disks 32' is thus coupled with the rotary motions thereof. The cam track 64 is designed such that immediately prior to reaching the position in which the rear edge of the supporting surface 33 (as viewed in the direction of rotation) arrives underneath the upstream edge of the chute 16a, the disks 32' are lowered and thus the lowermost item 12 is deposited on the slide plate portions 38a. Thereafter the disks 32' are rotated into the position where the aperture 47 lies underneath the chute 16a. Upon passage of the successive finger 18 the disks 32' are again rotated by 180° and are first lifted by the cam track 64 so that the disks 32' are in the upper position when the forward edge of the respective supporting surface 33 arrives underneath the rearward chute edge. In this variant the number of the items 12 that are pushed out of the chute 16a can be selected only according to the number of stages between which the carrier 50 may be height-adjusted. This variant has the advantage that it is simpler and more economical.

While the structures described in connection with FIGS. 5 to 10 were related to the first chute 16a, it is to be understood that any or all chutes may be provided with such constructions.

It will be understood that the above description of the present invention is susceptible to various modifications, changes and adaptations, and the same are intended to be comprehended within the meaning and range of equivalents of the appended claims.

What is claimed is:

1. An apparatus for forming groups of superposed, flat items, comprising
   (a) a conveyor including
      (1) a transporting device traveling in a conveying direction along a generally horizontal working flight; and
      (2) a plurality of upstanding pusher fingers secured to said transporting device; said pusher fingers being spaced from one another in a direction parallel to said conveying direction;
   (b) a plurality of storage chutes for holding items in a superposed stack therein; said storage chutes being positioned above said working flight and being spaced from one another in a direction parallel to said conveying direction; each said storage chute having a lower, item-discharging end;
   (c) a separate item-retaining device situated at said item-discharging end of each said chute; said item-retaining device including
      (1) a component defining an item-retaining surface for retaining the items in the chute by supporting a lowermost item of the stack; each said pusher finger being arranged for travel through and underneath said item-discharging end for pushing all items forming part of the stack in the chute and situated in a path of travel of said pusher finger, off said item-retaining device and for advancing the items in said conveying direction along said working flight; and (2) height-adjusting means for setting said component into different selected positions for changing a vertical distance of said item-retaining surface from said working flight to vary a number of items forming part of the stack in the chute and being situated in said path of travel;

(d) a plurality of sensors connected with respective said storage chutes for emitting signals representing one of a presence and absence of a predetermined height level of items in said storage chutes; and (e) a control apparatus connected to said sensors and said height-adjusting means for setting said component of the item-retaining devices in response to said signals.

2. The apparatus as defined in claim 1, wherein said pusher fingers have an upper terminal edge; further wherein said item-retaining surface is, in one of said selected positions, situated at such a height level that said upper terminal edge of said pusher fingers clears the lowermost item of the stack supported on said item-retaining surface upon passage of said pusher fingers through and underneath said discharge end, whereby no item is removed from the chute by the pusher fingers.

3. The apparatus as defined in claim 1, wherein said item-retaining device includes (a) two side-by-side arranged disks constituting said component and having an upper face forming said item-retaining surface; said pusher fingers being arranged for travel between said disks; and (b) separate shafts carrying said disks.

4. The apparatus as defined in claim 3, wherein said shafts are vertically oriented.

5. The apparatus as defined in claim 3, further comprising means for synchronously rotating said disks in opposite directions.

6. The apparatus as defined in claim 3, wherein each disk has first and second upward oriented faces being at different height levels and constituting said item-retaining surface; the first faces of said disks being at identical height levels and the second faces of said disks being at identical height levels; said first and second faces each having first and second operative positions for supporting the lowermost item of the stack; said number of items being situated in said path of travel in said first operative position being different from said number in said second operative position; said height adjusting means including a drive for rotating said disks to selectively place said first and second faces into one of said first and second operative positions.

7. The apparatus as defined in claim 3, wherein each said disk has an aperture; each said disk has a first position in which said upper face of said disks is in alignment with the item stack in the chute for supporting the lowermost item of the stack and a second position in which said aperture of said disks is in alignment with the item stack in the chute for allowing at least the lowermost item to fall through; further comprising a stationary slide positioned underneath the item-discharging end for receiving an item falling through said aperture and means for selectively moving said disks into said first and second positions.

8. The apparatus as defined in claim 7, selectively setting said stationary slide into one of a plurality of height positions.

9. The apparatus as defined in claim 7, further comprising a drive connected to said shafts for raising or lowering said disks in a direction parallel to said shafts.

10. The apparatus as defined in claim 1, wherein said component comprises a slide positioned underneath said discharge end.

11. The apparatus as defined in claim 1, wherein said height-adjusting means comprises a servomotor.

12. The apparatus as defined in claim 1, further comprising a slide disposed below said item-discharging end of at least one of said chutes for receiving items therefrom upon being pushed out of said item-discharging end by said pusher fingers; said slide being inclined downwardly in said conveying direction.

* * * * *